(12) United States Patent
Liu

(10) Patent No.: US 7,502,461 B2
(45) Date of Patent: Mar. 10, 2009

(54) ECHO CANCELLATION IN A COMMUNICATION NETWORK

(75) Inventor: Jianfeng Liu, Shanghai (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 711 days.

(21) Appl. No.: 10/883,666

(22) Filed: Jul. 6, 2004

(65) Prior Publication Data

US 2006/0007872 A1     Jan. 12, 2006

(30) Foreign Application Priority Data

Jul. 2, 2004     (CN) ............... 2004 1 0062119

(51) Int. Cl.
*H04M 9/08* (2006.01)
(52) U.S. Cl. .............. 379/406.14; 379/406.05; 379/406.09; 370/289
(58) Field of Classification Search ........... 379/406.05, 379/406.14, 406.01, 406.09; 370/286, 289, 370/352
See application file for complete search history.

(56) References Cited

U.S. PATENT DOCUMENTS 5,566,167 A * 10/1996 Duttweiler ................. 370/290
5,937,009 A * 8/1999 Wong et al. ................ 375/286
7,003,101 B2 * 2/2006 Seibert .................. 379/406.14

* cited by examiner

*Primary Examiner*—Olisa Anwah

(57) ABSTRACT

A method of canceling an echo in a signal of a communication network may include filtering an input signal and a corresponding reference signal of an echo path so as to produce vectors of N subband signals corresponding to the input signal and N subband reference echo signals corresponding to the reference signal. Vectors corresponding to a subset of the N subband signals may be adaptively adjusted to form modified vectors of the subset which approximate the corresponding N subband reference echo signals. Based on the modified vectors, subband errors related to a residual echo for each of the subband signals of the subset may be determined. The subband errors may be synthesized to generate a full-band signal with a synthesized residual echo.

10 Claims, 2 Drawing Sheets

ECHO CANCELLATION IN A COMMUNICATION NETWORK

BACKGROUND OF THE INVENTION

1. Field of the Invention

The present invention is related, in general, to echo cancellation in communication networks.

2. Description of the Related Art

Internet Protocol (IP) technology has begun to yield substantial cost savings to both corporations and consumers. With regard to the telecommunications field, Voice over IP (VoIP) technologies have been shown to be substantially more efficient than the plain old telephone service (POTS) system, and VoIP technologies may be poised to undergo substantial growth. Before such growth can be realized, however, designers desiring to use a telephony system such as a VoIP network should address hurdles related to speech quality or voice quality, for example.

Voice quality may vary substantially across a communication network such as a VoIP network. Many factors, such as the type of gateway equipment and/or phone systems being utilized, the client software, carrier infrastructures, etc., may influence voice quality. Another factor which may substantially influence voice quality is related to echo. In a VoIP network or other telephony system, an echo may be generated electrically, due to impedance mismatches at points along the transmission medium (i.e., 'line echoes').

Echoes commonly occur because of imperfect coupling of incoming signals at the 4-to-2 wire junctions in communications systems such as VoIP networks. The echoes typically result because the impedance of the 2-wire facility is imperfectly balanced in the 4-to-2 wire junction, causing the incoming signal to be partially reflected over an outgoing path to the source of incoming signals. Such echoes are invariably annoying and under extreme conditions may completely disrupt a conversation.

VoIP networks may suffer from a complex combination of echo-related problems. For example, in a given VoIP network, speech compression and packet routing may introduce one way delays ranging from about 20-300 ms. The total roundtrip delay can easily exceed 190 ms, in addition to the delay associated with Time Division Multiplexing (TDM) transmission. Thus, VoIP applications may require a much greater degree or sophistication in echo control, if toll-grade voice quality is to be maintained. Accordingly, the role of echo cancellation in general, and determining the most effective placement of echo cancellation in the VoIP network, should be design considerations for designers in an effort to maintain toll-grade voice quality in the network.

A significant source of line echoes in circuit-switched networks such as a VoIP network is a device called a hybrid. Hybrids are located in the circuit switched network at the point where the 4-wire network is converted to 2-wire local loop. Speech is transmitted over the VoIP network and passes through the hybrid (which generates a line echo) to the VoIP network. The echo then passes once again through the VoIP network, and may be delayed again for a total of up to 600 ms. At this point, the line echo or 'hybrid echo' becomes substantially noticeable to VoIP users.

One effort to control hybrid echo involves deploying a digital echo canceller that is directed towards a network such as Packet-Switched Telephone Network (PSTN) which may be in communication with a VoIP network. By placing an echo canceller at both ends (i.e., near end and far end) of a VoIP connection, the problem of hybrid echo may be eliminated. Incoming speech (signals) from the VoIP network to the hybrid may also be stored in memory associated with the echo canceller. The memorized signal may be subtracted from the echo of this signal that is combined with local speech from the near end, thereby leaving a small amount of residual echo. The residual echo may be further removed by a non-linear processor, for example, so as to produce a substantially echo-free result, or a residual echo below the audible range of human hearing.

Traditional echo cancellers primarily apply least mean square (LMS) type algorithms to adapt a filter structure ('adaptive filter') so as to approximate the echo path, in order to adaptively cancel hybrid echoes. However, when the echo duration is hundreds of milliseconds long, the number of filter taps of the adaptive filter increases proportionately and the convergence rate of the adaptive filter may slow significantly (the convergence rate refers to the speed or number of sample times for the echo canceller to reach a convergence state). Meanwhile, and similar to the case in the traditional PSTN network, another issue to address is how to ensure satisfactory echo canceller performance in the case of abrupt changes, which may be due to a change in the echo path or due to double talk, in the VoIP network.

SUMMARY OF THE INVENTION

An exemplary embodiment of the present invention is directed to a method of canceling an echo in a signal of a communication network. In the method, an input signal and a corresponding reference signal of an echo path may be filtered so as to produce vectors of N subband signals corresponding to the input signal and N subband reference echo signals corresponding to the reference signal. Vectors corresponding to a subset of the N subband signals may be adaptively adjusted to form modified vectors of the subset which approximate the corresponding N subband reference echo signals. Based on the modified vectors, subband errors related to a residual echo for each of the subband signals of the subset may be determined. The subband errors may be synthesized to generate a full-band signal with a synthesized residual echo.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Figure 1A:
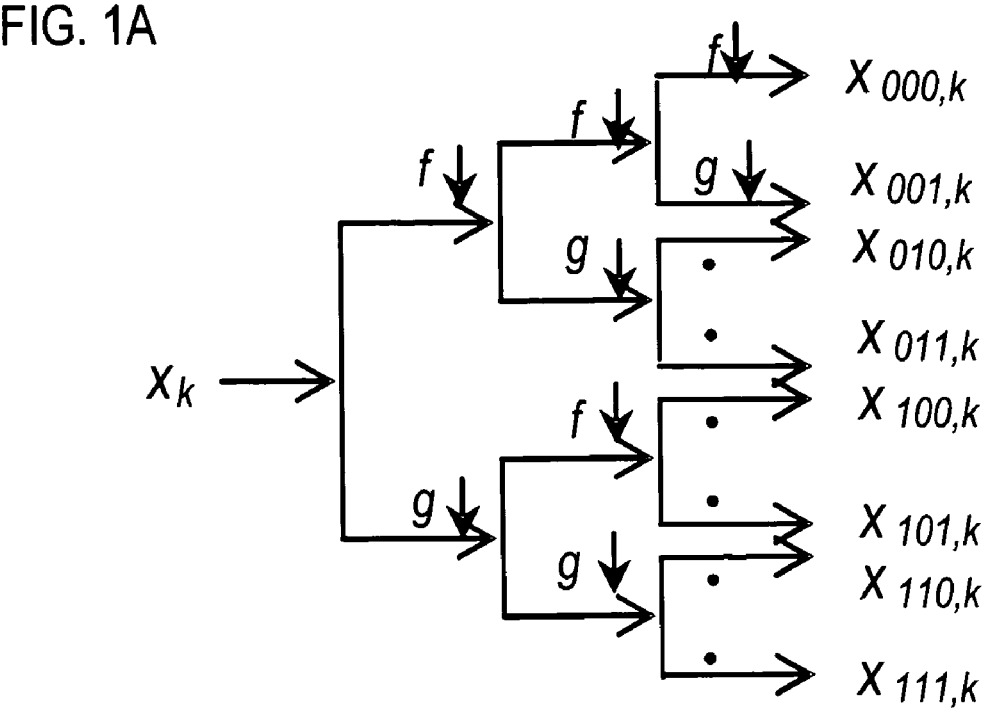
FIG. 1A illustrates a wavelet packet decomposition tree structure in accordance with an exemplary embodiment of the present invention.

In general, the exemplary embodiments of the present invention may be targeted at lowering the computational overhead required for echo cancellation in communication networks such as VoIP networks, while increasing both the convergence rate and stability in the case of abrupt changes in the VoIP network. Abrupt changes may be defined as changes in the echo path and/or a double talk condition. An echo path change may be due to environmental changes or other conditions, such as when one or more parties are dropped from a conference call in a PBX system, for example. A double talk condition may occur when both the near end and far end party to a telephone conversation taking place across a telephone line speak simultaneously.

In general, the exemplary methodologies described hereafter are based on a filtering process that may be referred to as "Wavelet Packet (WP) decomposition" and on an abrupt change detection and discrimination routine on those decomposed subbands determined as having the most dominant information. WP decomposition may simultaneously decompose both the low frequency part and the high frequency part of speech signals into subbands of finer resolutions. In a general example, WP decomposition may be applied on both the input and output speech signals of the echo path. As will be seen below, WP decomposition may be performed by a given number of filter banks of the exemplary echo canceller, so as to produce vectors of N subband signals that may be down sampled by a factor of N.

An adaptive normalized least mean squares (NLMS) filtering algorithm may be implemented within an NLMS adaptation and control unit of the exemplary echo canceller. The adaptive NLMS filtering algorithm with convergence factor switching between a large factor (such as a convergence factor of about 0.5), a small factor (such as a convergence factor of about 0.04) and zero may be applied respectively at the corresponding subbands that are determined as having significant energy, or 'most dominant information'. It should be understood that the values 0.5 and 0.04 are merely exemplary convergence factor values to represent relatively large and small convergence factors, as it would be evident to one skilled in the art that values other than 0.5 or 0.04 may be used. The determination may be based on comparing the energy in each of the subbands to a given energy threshold, for example. Subbands satisfying the threshold (hereafter occasionally referred to as 'significant subbands') may be subject to adaptive filtering. Subbands determined as having insignificant energy are not subject to the adaptive NLMS filtering.

The residual echoes of each of the subbands (those subbands subject to adaptive NLMS filtering) are synthesized as a final residual echo that may be output using a synthesizer of the echo canceller. The final residual echo output is desirably below the human audible range, for example. The synthesizer may be embodied as one or more Wavelet Packet Synthesizer (WPS) reconstruction filter banks. The WPS also reconstructs the original near-end speech signals (i.e., input speech signal of the echo path at the near end).

In an effort to avoid divergence or slow convergence speed in cases of abrupt changes, the exemplary methodology may continue monitoring the final synthesized residual echo for any abrupt change. If an abrupt increase of residual echo is detected, an exemplary echo path change/double talk discrimination approach employing an additional compensation filter may be applied to the subband having the most dominant residual echo information.

Meanwhile, the significant subbands inhibit their filter adaptations (i.e. set the convergence factor to zero) until a final discrimination result (as to whether the abrupt change is due to an echo path change or due to double-talk) is determined. This discrimination result may be determined by an NLMS adaptation and control unit in the exemplary echo canceller, for example. Once a given detection delay period (during which the discrimination mechanism invoked by the NLMS adaptation and control unit on the most dominant subband yields the discrimination result) has elapsed, each of the significant subbands may react immediately based on the discrimination result. For example, if the final discrimination result yielded by the NLMS adaptation and control unit indicates an echo path change, the convergence factors of all the subbands may be set to a substantially large convergence factor value (such as 0.5) so as to cancel the increased echo as fast as possible. This may be referred to as an 'aggressive adaptation mode'. Otherwise, if the final discrimination result indicates double talk, the convergence factors of all the subbands may be set to zero so as to avoid further cancellation of near-end speech and/or avoid divergence. This may be referred to as an 'inhibition mode'. Either of the above modes may continue until the new convergence is reached (e.g., the convergence factor may then be set to a substantially small value to ensure a reasonably low and stable residual echo return).

Subband Filtering

In an effort to decrease the number of adaptive filter taps in the exemplary echo canceller for a VoIP network, a feasible solution may be to apply subband filtering. Use of subband filtering in echo cancellation methodologies may reduce the computational complexity due to the down-sampling, and may speed up the convergence for NLMS algorithm, due to the decomposition of the input speech signal for lower-order adaptive filtering.

However, with subband decomposition the decomposed subbands, in general, have non-orthogonal overlaps. Thus, the recovered speech signal may be distorted in comparison with the original input speech signal. In accordance with the exemplary embodiments, and as to be described below, use of a wavelet transform may avoid such distortion problems. Wavelet packet decomposition may be viewed as kind of subband decomposition that may be selected as compactly supported in time. Compactly supported in time may be understood to mean that the decomposed subband signals may be theoretically finite in the time domain. As will be seen in further detail below, an input speech signal decomposed using WP decomposition may be perfectly reconstructed from its wavelet decomposition.

Wavelet Packet Decomposition and Wavelet Packet Reconstruction

In general, wavelet transform decomposition may be defined as recursively decomposing low frequency parts of input signals (such as speech or voice signals) into finer resolution. Since voice information is not necessarily concentrated on the low frequency part, recursively decomposing the low frequency part of the voice signals does not make much sense. The exemplary embodiments of the present invention introduce the application of a tree-structured wavelet, 'Wavelet Packet (WP) decomposition' to both the input and output signals of the echo path of the input speech signal. As previously discussed, WP decomposition may be defined as a set of wavelet decompositions that simultaneously decomposes both the low frequency and high frequency parts of signals into subbands of finer resolution. A wavelet packet (subband) thus has the same compact support and reconstruction properties of the wavelet transform.

Figure 1B:
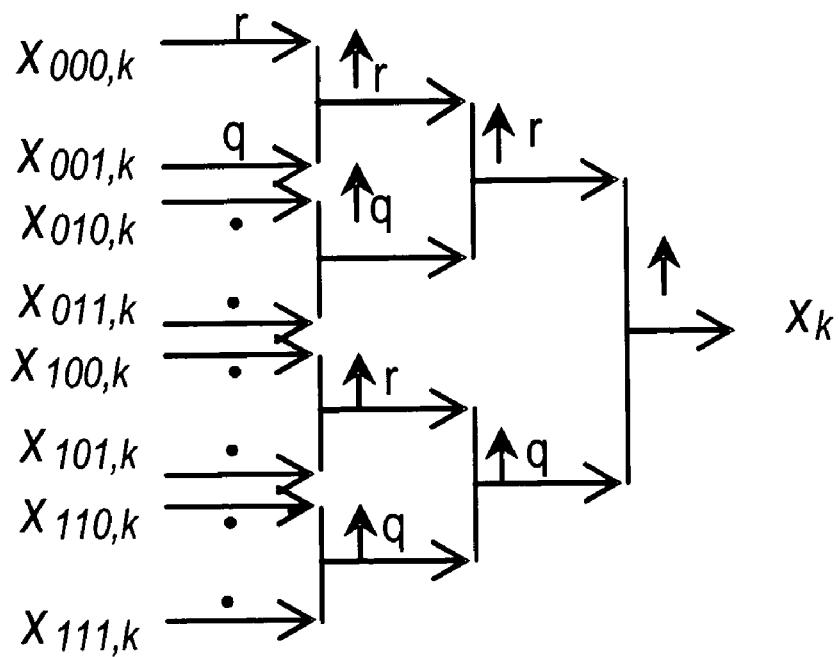
FIG. 1B illustrates a wavelet packet reconstruction tree structure in accordance with an exemplary embodiment of the present invention.

FIG. 1A illustrates a wavelet packet decomposition tree structure in accordance with an exemplary embodiment of the present invention; and FIG. 1B illustrates a wavelet packet reconstruction tree structure in accordance with an exemplary embodiment of the present invention. Referring to FIG. 1A, a WP decomposition of an input speech signal, $x_k$, may be recursively calculated as indicated in Expression (1):

$$\begin{cases} x_{0b,k} = \sum_n f_{2k-n} x_{b,n} \\ x_{1b,k} = \sum_n g_{2k-n} x_{b,n} \end{cases} \quad (1)$$

In Expression (1), 'f' may represent a low pass filter coefficient vector, 'g' may represent a high pass wavelet filter coefficient vector, k may be the current sample time, n may be the tap length of f and g, and b may be a binary number, i.e., b=0, 1, 00, 01, 10, 11. Initially, $x_{b,k}=x_k$ and at the $m^{th}$ level decomposition, b may be a binary number with m digits. Referring to FIG. 1A, $x_{0b,k}$ and $x_{1b,k}$ may be down sampled from its upper level by a factor of 2. This may be represented by the down arrows (↓) shown in each level of the tree structure of FIG. 1A.

Referring to FIG. 1B, the original input speech signal $x_k$ may be reconstructed by reversing the above algorithm of Expression (1), as shown for example in Expression (2):

$$x_{b,k} = \sum_n r_{k-2n} x_{0b,n} + \sum_n q_{k-2n} x_{1b,n}. \quad (2)$$

In Expression (2), 'r' and 'q' may represent the reconstruction filters corresponding to f and g respectively. Here too, k may denote the current sample time, and n may represent the tap length of r and q. In FIG. 1B, (↑) denotes up-sampling by a factor of 2.

Figure 2:
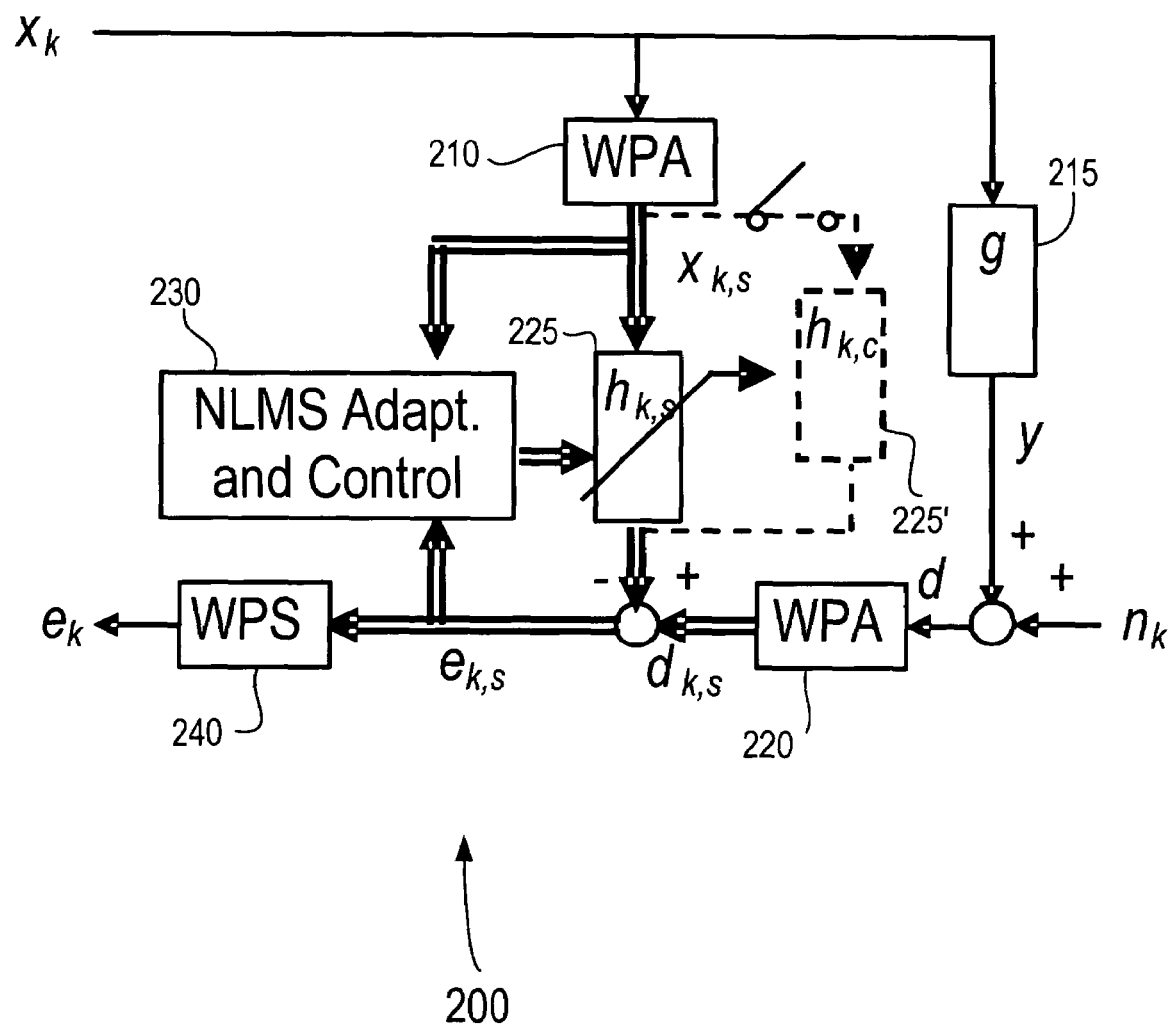
FIG. 2 is a block diagram illustrating an echo canceller in accordance with an exemplary embodiment of the present invention.

FIG. 2 is a block diagram illustrating an echo canceller in accordance with an exemplary embodiment of the present invention. In FIG. 2, an exemplary wavelet-based echo canceller 200 may include wavelet packet analysis (WPA) filter banks 210 and 220, high-pass wavelet filter 215, adaptive filter 225, an NLMS adaptation and control unit 230 and a wavelet packet synthesizer (WPS) 240, for example. Optionally, echo canceller may include an additional adaptive filter 225' (shown in dotted line outline in FIG. 2).

Referring to FIG. 2, a far-end input speech signal $x_k$ and a reference signal $d_k$ (where $d_k$ may represent the sum of the near-end speech $n_k$ plus the echo generated by echo path before cancellation. 'y' (i.e., the output of high-pass wavelet filter 215) may be passed through the WPA filter banks 210 and 220 respectively, producing vectors of N subband signals at level M (N=2M) which may be down-sampled by a factor of N. Thus, sampling and filtering may be performed at a reduced sampling rate.

For subbands having dominant information, which may be referred to as significant subbands, the adaptive filter 225 ($h_{k,s}$) forms a vector of subband signal $y_{k,s}$ to approximate the corresponding subband reference echo $d_{k,s}$. In FIG. 2, the double path line (=) denotes an array of subbands including those containing insignificant information. The resulting subband errors $e_{k,s}$ may be passed through WPS 240 to output a full-band signal $e_k$ that may be transmitted back to the remote loudspeaker, for example. The full-band signal may also include a final residual echo which is output from WPS 240. The residual echoes of each of the subband signals which are subject to NLMS adaptive filtering (i.e., those subbands determined as having dominant or important information) are synthesized at WPS 240, so that the full-band signal with final residual echo (at a level below the human audible range) is transmitted back to the remote loudspeaker.

The algorithm performed by NLMS adaptation and control unit 230 to adaptively adjust $h_{k,s}$ for the significant subbands is an NLMS algorithm given by the following Expressions (3)-(5). The following signals/variables in the expressions below represent signals/variables on a single subband. For convenience, the subscript s is eliminated in the following formulas.

$$h_{k+1} = h_k + \frac{\alpha_k}{\|x_k\|^2} \cdot e_k \cdot x_k, \quad (3)$$

with $$e_k = x_k^T \cdot (g - h_k) + n_k \quad (4,5)$$
$$d_k = x_k^T \cdot g + n_k.$$

In Expression (3), $0<\alpha_k<2$ represents the convergence factor that controls the stability and convergence rate, $\|x_k\|^2$ represents the norm of the input vector $x_k$, g is the actual echo path coefficient vector, and $n_k$ is additive noise (or near-end speech in the case of double talk). In Expressions (4) and (5), T denotes matrix transpose. In an effort to ensure both fast convergence speed and low residual echo return, $\alpha_k$ may be set as follows:

$$\alpha_{k+1} = \begin{cases} \alpha_{max} & \text{If start of a call/echo path change} \\ \alpha_{min} & \text{If convergence} \\ 0 & \text{If double talk.} \end{cases} \quad (6)$$

In Expression (6), $\alpha_{max}$, which is a convergence factor corresponding to the 'aggressive adaptation mode' (which would be the case where an abrupt change is due to start of a call or an echo path change) can be chosen as 0.5, for example. The convergence factor $\alpha_{min}$ (corresponding to low adaptation mode, such as where convergence is attained) can be chosen as 0.04. The convergence factor $\alpha_k=0$ may correspond to the inhibition mode, i.e., where the abrupt change is due to double talk.

In order to determine whether convergence has been reached or not, the following lemma may be applied: If $|x_k|^2<C\cdot|e_k|^2$, where ('| |' may represent a short time windowed energy, and C may be a selectable constant, which may be 1000, for example) then convergence is reached. Otherwise, either the convergence is not reached or an abrupt change has occurred.

In accordance with the exemplary embodiments of the present invention, subbands may be determined as having dominant information ('significant subbands') based on a threshold criteria. For example, subband energy may be used to decide the importance of a subband, whether it contains dominant information, as reflected by the energy therein, so as to be determined a significant subband, or not. As previously discussed, the double path line (=) denotes an array of subbands containing significant information.

In an example, if the energy of a given subband is greater than ¼ of the average energy of all the subbands (where ¼ of the average energy of all the subbands may represent an energy threshold), then the subband is regarded as containing important or dominant information and is subjected to the NLMS algorithm in NLMS adaptation and control unit 230. Otherwise, the subband is determined as containing insignificant information and is ignored (i.e., it is an insignificant subband is not processed for echo cancellation). The threshold evaluation may be done within the NLMS adaptation and control unit 230, for example.

In an effort to perform echo cancellation with fewer computations and smaller echo residuals, the following exemplary wavelet analysis coefficients and synthesis coefficients may be employed:

$$f_n = [-.0986, -.1262, -.0406, .0126, -.0520, -.1172,$$
$$-.1249, -.2383, -.4954, -.5672, -.2041, -.2752, .3513,$$
$$.0424, -.1500, -.0052, .1688, .0976, -.0070, -.0920],$$
$$g_n = (-1)^{L-n} f_{L-n}, r_n = f_n, q_n = g_{-n}.$$

In the above expressions for $f_n$ and $g_n$, L=20 may represent the number of coefficients. It should be evident to those having ordinary skill in the art that other wavelet analysis coefficients and synthesis coefficients may be selected for $f_n$ and $g_n$.

Abrupt Change Detection and Discrimination

As discussed above in general, the behavior of echo cancellation in the case of an abrupt change (either due to an echo path change or due to the presence of double talk) may substantially influence overall echo canceller performance. Hence, accurate detection of an abrupt change and discrimination whether the abrupt change is due to an echo path change or due to double talk is desirable. Accordingly, for efficiency and detection accuracy, the above methodology may be modified in an effort to effectively discriminate double talk from echo path change.

Since the input signal $x_k$ and the reference signal $d_k$ have already been decomposed into subbands, one intuition may be to apply a modified discrimination methodology on all the subbands, or to apply the modified discrimination method on the full-band signals ($x_k$) prior to WP decomposition in WPA filter banks 210 and 220. This, however, may necessitate substantial computing power and memory consumption.

In an effort to reduce computational overhead and memory requirements, the exemplary embodiments of the present invention invoke the echo path change or double talk discrimination mechanism only on the subband containing the most dominant residual echo information. The most dominant subband may be determined based on whether the energy of its residual echo is the largest. The discrimination result (which is reflective of the energy of the most dominant of the significant subbands) should be representative of the actual full-band situation.

To detect any abrupt change situation, the exemplary methodology continues monitoring the synthesized residual echo (i.e., of the full-band signal $e_k$ output of WPS filter bank 240) for an abrupt change. Whenever an abrupt change is detected, (i.e., $|x_k|^2 < C \cdot |e_k|^2$) the exemplary methodology may immediately compute and/or determine the most dominant subband by determining the significant subband whose energy of the residual echo is the largest, for example. The determination may be made by the NLMS adaptation and control unit 230, for example.

On this most dominant subband, the current adaptive filter coefficients may be retained and meanwhile updated in the aggressive mode (which corresponds to adding a second compensation filter 225' ('$h_{k,c}$') in FIG. 2). Within a substantially short detection delay period (for example, on the order of tens of milliseconds) before the abrupt change is further discriminated by the dominant subband, all the significant subbands may yield their respective residual echo with the filter taps frozen (i.e., with the convergence factor set to zero).

Meanwhile in the dominant subband, the current residual echo produced by the aggressively adapted filter (compensation filter 225' ($h_{k,c}$) may be compared with the residual echo produced by the retained filter whose adaptation is frozen. If the short-term averaged residual echo yielded by the aggressively adapted filter remains lower than the retained filter output over the delay period, then it is determined that an echo path change has occurred. In this case, all the subbands running the NLMS algorithm may immediately switch to the aggressive adaptation mode (see Expression (3), where ($\alpha_k$ is set to $\alpha_{max}$) until a new convergence is achieved. Otherwise, it is determined that the residual echo increase is caused by double talk. All the significant subbands then maintain the inhibition mode (adaptation-frozen, $\alpha_k$=0) until the error signal (residual echo) decreases to return to the pre-abrupt change value. Accordingly, based on the discrimination result, the adaptation mode of the subbands may be updated so as to reach a new convergence state without canceling near end speech, for example.

As an alternative approach which may enhance the detection accuracy, the abrupt change detection and discrimination methodology may be applied on several of the most dominant subbands. Thus, the final discrimination result may be determined based on the majority of the discrimination results of these subbands.

The exemplary embodiments of the present invention may provide echo cancellation in VoIP network so as to achieve efficiency and effectiveness, as described in the following example. Initially, to control hybrid echo of hundreds of millisecond round trip delay in a VoIP network, for example, a wavelet packet analysis (decomposition) and wavelet packet synthesis (reconstruction) approach may be applied. With WP decomposition and NLMS adaptation on the decomposed subbands, the computation overhead may be substantially reduced and convergence rate may be increased. For example, with M levels of WP decomposition, the computation overhead may be reduced by a factor of approximately $2^M$. Meanwhile, since NLMS algorithm is applied only to subbands having dominant information (subbands determined as significant or important based on comparing their energy to an energy threshold) the computation overhead may be even further reduced.

Additionally, the exemplary methodology may be expanded to address an abrupt change condition in a communication network such as a VoIP network, so as to effectively detect the abrupt change and differentiate echo path change from double talk. For example, the exemplary methodology may discriminate echo path change from double talk more accurately than the known Geigel method. As is known, when the magnitude of $d_k$ is −6 dB lower than $x_{max,k}$ during double talk, the Geigel algorithm fails to detect the double talk. The Geigel algorithm is also sensitive to near-end noise interference. In contrast, the exemplary methodology can yield accurate discrimination in both the above cases. Hence, more stable and desirable network performance is possible in the case of abrupt changes in VoIP network.

Further, instead of initiating the abrupt change detection and echo path change/double talk discrimination mechanism on all the subbands, the detection and discrimination mechanism is applied only on the most dominant subband. With this feature, both computational overhead and the memory requirements may be further reduced.

It should be recognized by those of skill in the art that FIGS. 1-2 and/or components thereof can be implemented on a general purpose digital computer using appropriate software to provide updating of the coefficients as shown herein and other digital filtering and processing functions. Alternatively, the echo canceller and/or its individual components may be implemented on one or more integrated circuits chips having software burned or stored therein for providing the functionality herein described. In a preferred embodiment, the device is a programmable integrated circuit or a programmable logic array.

Of course, it will be recognized that the functions of FIGS. 1A and 1B and/or block diagram of FIG. 2, or parts thereof, may also be implemented in a digital signal processor (DSP), that could perform all or part of the functions described herein. Moreover, while the exemplary embodiments described and shown herein has been described in the context of a communication network such as a VoIP network, it will be recognized by those of skill in the art that such signal processing techniques can be applied in other fields of endeavor, such as analog and/or digital audio or video, noise cancellation, telephone instruments, conference telephones, radio frequency microwave or optical communications, or any other field of endeavor requiring some type of adaptive filtering.

The exemplary embodiments of the present invention being thus described, it will be obvious that the same may be varied in many ways. Such variations are not to be regarded as a departure from the scope of the exemplary embodiments of the present invention, and all such modifications as would be obvious to one skilled in the art are intended to be included within the scope of the following claims.

What is claimed is:

1. A method of canceling an echo in a signal of a communication network, comprising:
    filtering an input signal and a corresponding reference signal of an echo in an echo path to produce vectors of N subband input signals corresponding to the input signal and N subband reference echo signals corresponding to the reference signal;
    cancelling the echo by adaptively adjusting vectors corresponding to a subset of the N subband input signals to form modified vectors of the subset of the N subband input signals which approximate the corresponding N subband reference echo signals to produce a residual echo for each of the N subband input signals of the subset;
    determining subband errors to detect the residual echo for each of the N subband input signals of the subset, based on the modified vectors; and
    cancelling the residual echo by synthesizing the subband errors to generate a full-band signal with a synthesized residual echo.

2. The method of claim 1, wherein filtering includes subjecting the input signal and reference signal of the echo path to a wavelet decomposition process.

3. The method of claim 1, wherein cancelling the residual echo by synthesizing the subband errors includes subjecting the subband errors to a wavelet reconstruction process to generate the full-band signal with synthesized residual echo.

4. The method of claim 1, further comprising:
    comparing the N subband input signals to a threshold to determine the subset of the N subband input signals to be adaptively adjusted.

5. The method of claim 4, wherein comparing includes, for each of the N subband input signals, comparing energy of the one of the N subband input signals corresponding residual echo to a threshold, and ones of the N subband input signals having energy exceeding the threshold are included in the subset of the N subband input signals to be adaptively adjusted.

6. The method of claim 4, wherein
    cancelling the echo by adaptively adjusting includes subjecting the subset of the N subband input signals to a normalized least mean squares (NLMS) adaptation algorithm to form the modified vectors, and
    comparing includes comparing energy of each given N subband input signal to a threshold, wherein the one of the N subband input signals having energy exceeding the threshold are subjected to the NLMS adaptation algorithm.

7. The method of claim 1, wherein filtering and cancelling the echo by adaptively adjusting are performed at a reduced sampling rate.

8. The method of claim 1, further comprising:
    monitoring the synthesized residual echo to detect an abrupt change in the full band signal;
    selecting a most dominant of the N subband input signals from the subset of the N subband input signals, if an abrupt change is detected in the synthesized residual echo;
    determining a discrimination result based on the most dominant of the N subband input signals; and
    determining whether to alter convergence factors used for adaptively adjusting vectors of the subset of N subband input signals, based on the discrimination result.

9. The method of claim 8, wherein an abrupt change is detected if an energy value of the input signal exceeds an energy value of the full band signal multiplied by a given constant.

10. The method of claim 8, wherein
    selecting includes selecting one of the N subband input signals of the subset having a corresponding residual echo has with greatest energy as the most dominant of the N subband input signals,
    the discrimination result indicates whether the abrupt change in the synthesized residual echo is due to an echo path change or to a double talk condition, and
    determining whether to alter convergence factors includes updating, based on the discrimination result, an adaptation mode of the N subband input signals so as to reach a new convergence state without canceling near end speech.

* * * * *